US010872028B2

(12) United States Patent
Kuris et al.

(10) Patent No.: US 10,872,028 B2
(45) Date of Patent: Dec. 22, 2020

(54) METHODS AND SYSTEMS FOR IDENTIFYING DUPLICATE JOBS IN A CONTINUOUS INTEGRATION ENVIRONMENT

(71) Applicant: Red Hat Israel, Ltd., Ra'anana (IL)

(72) Inventors: Eran Kuris, Holon (IL); Alexander Stafeyev, Bet shemes (IL); Arie Bregman, Gan Yavne (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 16/290,170

(22) Filed: Mar. 1, 2019

(65) Prior Publication Data

US 2020/0278916 A1    Sep. 3, 2020

(51) Int. Cl.
*G06F 11/36*     (2006.01)
(52) U.S. Cl.
CPC ...... *G06F 11/3612* (2013.01); *G06F 11/3664* (2013.01); *G06F 11/3688* (2013.01)
(58) Field of Classification Search
CPC ............ G06F 11/3612; G06F 11/3664; G06F 11/3688; G06F 11/36–3696; G06F 8/60–71
USPC .................................. 717/124–135, 168–178
See application file for complete search history.

(56) References Cited

U.S. PATENT DOCUMENTS 5,021,997 A * 6/1991 Archie ................ G06F 11/2257
714/31
6,003,011 A * 12/1999 Sarin ....................... G06Q 10/04
705/7.26
6,658,423 B1 * 12/2003 Pugh ..................... G06F 16/355
8,402,004 B2 * 3/2013 Provenzano ........ G06F 16/1748
707/692
8,607,212 B2 * 12/2013 Hoberman ................ G06F 8/20
717/164

(Continued)

FOREIGN PATENT DOCUMENTS

WO    2018145559    8/2018

OTHER PUBLICATIONS

"Where can I find Jenkins restful api reference?" Stack Overflow, answer by Lovato dated Sep. 5, 2014 and last edited by James McMahon on Nov. 1, 2017, last retrieved from https://stackoverflow.com/questions/25661362/where-can-i-find-jenkins-restful-api-reference on Feb. 17, 2020 (Year: 2017).*

(Continued)

*Primary Examiner* — Andrew M. Lyons
(74) *Attorney, Agent, or Firm* — K&L Gates LLP (57) ABSTRACT

Methods and systems are provided for comparing and identifying job definition files that are hard copies and soft copies of one another. In one embodiment, a method is provided that includes receiving and splitting a first job definition file into a first plurality of stages. The method further comprises comparing the first plurality of stages with a second plurality of stages from a second job definition file. Corresponding stages may be identified and used to determine whether the first and second job definition files are hard or soft copies of one another. If the first and second job definition files are hard copies, one of the job definition files may be deleted from a continuous integration environment. If the first and second job definition files are soft copies, a generic job definition file may be generated based on the first and second job definition files.

20 Claims, 6 Drawing Sheets

(56) References Cited

U.S. PATENT DOCUMENTS

| | | | |
|---|---|---|---|
| 9,367,554 B1 | 6/2016 | Heemskerk et al. | |
| 2004/0010735 A1* | 1/2004 | Paternostro | G06F 11/3684 |
| | | | 714/38.14 |
| 2006/0253742 A1* | 11/2006 | Elenburg | G06F 11/3414 |
| | | | 714/38.14 |
| 2007/0143745 A1* | 6/2007 | Dasari | G06F 8/74 |
| | | | 717/136 |
| 2008/0065630 A1* | 3/2008 | Luo | G06F 16/258 |
| 2011/0314447 A1* | 12/2011 | Malyshev | G06F 8/60 |
| | | | 717/110 |
| 2012/0075661 A1* | 3/2012 | Logishetty | G06F 3/1204 |
| | | | 358/1.15 |
| 2014/0033175 A1* | 1/2014 | Lee | G06F 11/3684 |
| | | | 717/124 |
| 2014/0053089 A1* | 2/2014 | von Bochmann | G06F 3/0484 |
| | | | 715/760 |
| 2014/0115565 A1* | 4/2014 | Abraham | G06F 8/30 |
| | | | 717/128 |
| 2015/0261745 A1* | 9/2015 | Song | G06F 40/56 |
| | | | 704/9 |
| 2017/0010889 A1* | 1/2017 | Spektor | G06F 11/3672 |
| 2017/0093593 A1* | 3/2017 | Yang | H04L 12/2816 |
| 2018/0046482 A1* | 2/2018 | Karve | G06F 9/45558 |
| 2018/0181446 A1* | 6/2018 | Bequet | G06F 16/9024 |
| 2018/0181609 A1* | 6/2018 | Chen | G06Q 10/1053 |
| 2018/0181808 A1* | 6/2018 | Sridharan | G06K 9/00449 |
| 2018/0267884 A1 | 9/2018 | Dhanda et al. | |
| 2018/0373620 A1* | 12/2018 | Thomson | G06F 11/3684 |
| 2019/0138288 A1* | 5/2019 | Brealey | G06F 8/65 |

OTHER PUBLICATIONS gov.uk, "Continuous Delivery", https://www.digitalmarketplace.service.gov.uk/g-cloud/services/875371461278936; published Oct. 2018, retrieved Dec. 24, 2018; (5 pages).

Google Cloud, "Method: projects.locations.queues.tasks.create", https://cloud.google.com/tasks/docs/reference/rest/v2beta3/projects.locations.queues.tasks/create; published Sep. 21, 2018, retrieved Dec. 24, 2018; (4 pages).

Equitronix, "DevOps: Streamline Processes; Unlock Productivity", http://www.equitronix.com/devops/, retrieved Dec. 24, 2018; (3 pages).

Avantika Mathur, "Too Many Scripts Can Kill Your Continuous Delivery", https://www.infoq.com/news/2018/06/scripts-continuous-delivery, published Jun. 19, 2018, retrieved Dec. 24, 2018; (2 pages).

* cited by examiner

METHODS AND SYSTEMS FOR IDENTIFYING DUPLICATE JOBS IN A CONTINUOUS INTEGRATION ENVIRONMENT

BACKGROUND

Continuous integration development systems are designed to regularly integrate and deploy programs for users. Such continuous integration environments reduce the time required to develop and deploy new features and increase access to newly-developed features for users. To continuously deploy newly-developed features or updates, code bases written by developers are regularly tested before deployment. These developers also design and create tests for program features to run before deployment.

SUMMARY

The present disclosure presents new and innovative methods and systems for identifying duplicate jobs in a continuous integration environment. In one embodiment, a method is provided comprising receiving a first job definition file for execution in a continuous integration environment, splitting the first job definition file into a first plurality of stages, and comparing the first plurality of stages with a second plurality of stages from a second job definition file to determine one or more corresponding stages between the first and the second plurality of stages. The method may further comprise determining, based on the one or more corresponding stages, whether the first and the second job definition files are hard copies or soft copies of one another, removing, responsive to determining that the first and the second job definition files are hard copies of one another, one of the first and the second job definition files from the continuous integration environment, and generating, responsive to determining that the first and the second job definition files are soft copies of one another, a generic job definition file based on the first and the second job definition files.

In another embodiment, comparing the first plurality of stages with the second plurality of stages further comprises determining a testing function performed by at least a subset of the first plurality of stages and identifying the corresponding stages as stages from the first and second plurality of stages that perform the same testing function.

In yet another embodiment, the first plurality of stages comprises a first plurality of job commands and the second plurality of stages comprises a second plurality of job commands.

In a further embodiment, comparing the first plurality of stages with the second plurality of stages further comprises comparing the job commands of one of the first plurality of stages to the job commands of a corresponding stage from the second plurality of stages.

In a still further embodiment, the generic job definition file includes a generic job command.

In another embodiment, generating the generic job definition file further comprises identifying a first job command of the first job definition file and a second job command of the second job definition file, identifying a common portion of the first and the second job commands, identifying differing portions of the first and the second job commands, and generating the generic job command to include the common portion and a generic portion representative of the differing portions of the first and the second job commands.

In yet another embodiment, the method further comprises identifying a third job command of the first job definition file and a fourth job command of the second job definition file, wherein the third and the fourth job commands do not share a common portion and generating the generic job command to include both the third and the fourth job commands.

In a further embodiment, a hard copy is determined if a similarity measure of the first and the second plurality of stages exceeds a first threshold.

In a still further embodiment, a soft copy is determined if the similarity measure is less than the first threshold and exceeds a second threshold.

In another embodiment, the job comparison file indicates no copy if the similarity measure is less than the second threshold In yet another embodiment, the first job definition file is split into the first plurality of stages at locations identified based on at least one of a keyword and a pattern.

In a further embodiment, the keyword is received from an API of the continuous integration environment.

In a still further embodiment, a system is provided comprising a processor and a memory. The memory may store instructions which, when executed by the processor, cause the processor to receive a first job definition file for execution in a continuous integration environment, split the first job definition file into a first plurality of stages, and compare the first plurality of stages with a second plurality of stages from a second job definition file to determine one or more corresponding stages between the first and the second plurality of stages. The memory may store further instructions which, when executed by the processor, cause the processor to determine, based on the one or more corresponding stages, whether the first and the second job definition files are hard copies or soft copies of one another, remove, responsive to determining that the first and the second job definition files are hard copies of one another, one of the first and the second job definition files from the continuous integration environment, and generate, responsive to determining that the first and the second job definition files are soft copies of one another, a generic job definition file based on the first and the second job definition files.

In another embodiment, the memory contains further instructions which, when executed by the processor, cause the processor to determine a testing function performed by at least a subset of the first plurality of stages and identify the corresponding stages as stages from the first and second plurality of stages that perform the same testing function.

In yet another embodiment, the first plurality of stages comprises a first plurality of job commands and the second plurality of stages comprises a second plurality of job commands, and the memory contains further instructions which, when executed by the processor, cause the processor to compare the job commands of one of the first plurality of stages to the job commands of a corresponding stage from the second plurality of stages.

In a further embodiment, the generic job definition file includes a generic job command, and the memory contains further instructions which, when executed by the processor, cause the processor to identify a first job command of the first job definition file and a second job command of the second job definition file, identify a common portion of the first and the second job commands, identify differing portions of the first and the second job commands, and generate the generic job command to include the common portion and a generic portion representative of the differing portions of the first and the second job commands.

In a still further embodiment, the memory contains further instructions which, when executed by the processor, cause the processor to identify a third job command of the first job definition file and a fourth job command of the second job definition file, wherein the third and the fourth job commands do not share a common portion and generate the generic job command to include both the third and the fourth job commands.

In another embodiment, a hard copy is determined if a similarity measure of the first and the second plurality of stages exceeds a first threshold, and a soft copy is determined if the similarity measure is less than the first threshold and exceeds a second threshold.

In yet another embodiment, the memory contains further instructions which, when executed by the processor, cause the processor to split the first job definition file into the first plurality of stages at locations identified based on at least one of a pattern and keyword, wherein the keyword is received from an API of the continuous integration environment.

In a further embodiment, a non-transitory, computer-readable medium is provided storing instructions which, when executed by a processor, cause the processor to receive a first job definition file for execution in a continuous integration environment, split the first job definition file into a first plurality of stages, and compare the first plurality of stages with a second plurality of stages from a second job definition file to determine one or more corresponding stages between the first and the second plurality of stages. The non-transitory, computer-readable medium may store further instructions which, when executed by a processor, cause the processor to determine, based on the one or more corresponding stages, whether the first and the second job definition files are hard copies or soft copies of one another, remove, responsive to determining that the first and the second job definition files are hard copies of one another, one of the first and the second job definition files from the continuous integration environment, and generate, responsive to determining that the first and the second job definition files are soft copies of one another, a generic job definition file based on the first and the second job definition files.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Developers are typically responsible for creating and adding jobs to test programs and code bases developed within a continuous integration environment. It is therefore typically easy for these developers to add jobs to the continuous integration environment. However, over time as multiple developers work on the same or similar programs and code bases, the developers may add identical or similar job definition files to the continuous integration environment. As each of these duplicative or nearly duplicative job definition files are regularly executed, such duplicative or nearly duplicative job definition files may waste system resources of the continuous integration environment. Over time, a large number of regularly-executing duplicative or nearly duplicative jobs (e.g., hundreds or thousands of jobs) may be that waste significant system resources. Such a large number of unnecessary jobs can cause substantial delays (e.g., up to several hours or more) in testing new features before deployment. Such delays may seriously impede deployment of new features and may undermine the "continuous" nature of continuous integration systems.

One way of solving the problem is to automate removal of duplicative job definition files within the continuous integration environment to identify the duplicative or nearly duplicative job definition files added by developers. To accomplish this, the system may receive a job definition file from the continuous integration environment and may compare stages of the job definition file with stages from another job definition file. To compare the stages, corresponding stages may be identified between both job definition files. If both job definition files share corresponding stages, they may be identified as copies of one another. In particular, the system may determine whether the job definition files sharing corresponding stages are hard copies or soft copies of one another. Job definition files that are hard copies may be removed from the continuous integration environment, while job definition files that are soft copies may be replaced with a generic job definition file. For example, the job definition file may include common aspects of both job definition files and may also include a generic portion intended to capture the portions of both job definition files that differ. Such an implementation may help reduce the number of duplicative, hard copy job definition files that consume system resources unnecessarily. The implementation may also help remove job definition files that are similar, improving consistency and reducing the number of similar job commands being executed multiple times. Such a system may thereby improve hardware utilization within the continuous integration environment by reducing processor and memory use and requirements, while also improving the testing frequency for job definition files that are regularly relied on by developers.

Figure 1:
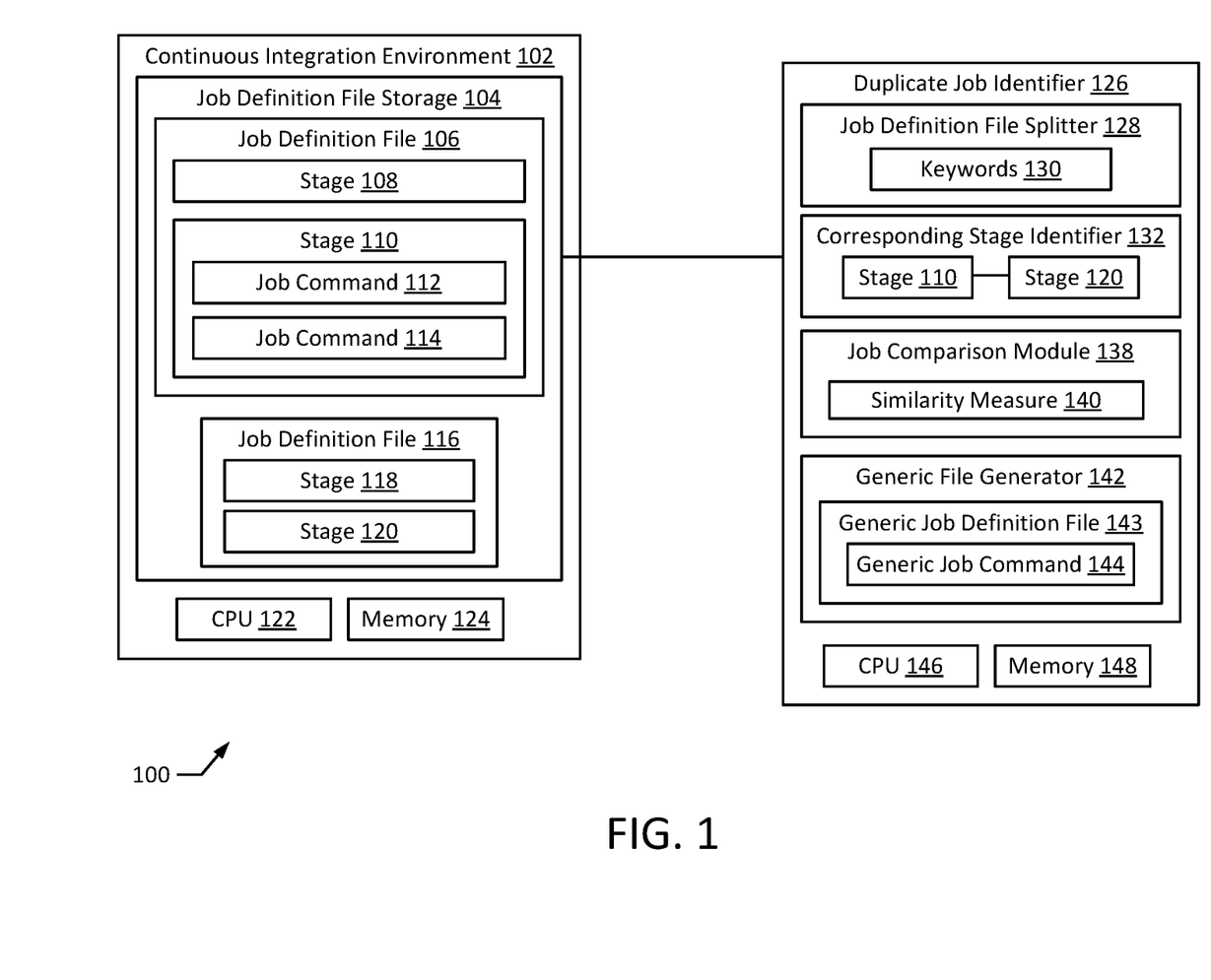
FIG. 1 illustrates a system according to an exemplary embodiment of the present disclosure.

FIG. 1 depicts a system 100 according to an exemplary embodiment of the present disclosure. The system 100 may be used to compare job definition files and identify job definition files that are hard copies and/or soft copies of one another.

The system 100 includes a continuous integration environment 102 and a duplicate job identifier 126. The continuous integration environment 102 includes a job definition file storage 104, a CPU 122, and a memory 124. The job definition file storage 104 stores job definition files 106, 116, comprising stages 108, 110, 118, 120. The stage 110 further comprises job commands 112, 114. The duplicate job identifier 126 includes a job definition file splitter 128 storing key words 130, a corresponding stage identifier 132 to identify corresponding stages 110, 120, a job comparison module 138 storing a similarity measure 140, a generic file generator 142 storing a generic job definition file 143, which further comprises a generic job command 144. The duplicate job identifier 126 also includes a CPU 146 and a memory 148.

The continuous integration environment 102 may be configured to test program code prior to deployment. For example, the continuous integration environment 102 may be configured to test program code using job definition files 106, 116 stored within the job definition file storage 104. As a further example, the job definition files 106, 116 may define jobs configured to test one or more networking, operational, compilation, integration, or other aspects of a program or code base. The job definition files 106, 116 may be configured to execute based on one or more triggering actions, including action-based triggering actions (e.g., triggering when a developer checks in a corresponding code base), time-based triggering actions (e.g., every day, week, month), and manual triggering actions (e.g., responsive to user requests to execute). As explained above, the jobs may consume system resources of the continuous integration environment 102 and may execute in a queue according to one or more of a priority of the job, a priority of a corresponding code base of the job, and a time of a triggering action associated with the job. Code bases under development may be prevented from deployment until all associated jobs within the continuous integration environment 102 have completed successfully. Therefore, unnecessary and numerous job definition files may prevent code bases from quick deployment.

As depicted, the job definition files 106, 116 may comprise one or more stages 108, 110, 118, 120. Each stage 108, 110, 118, 120 may perform a particular testing function (e.g., copying a code base, installing dependencies of the code base, compiling a code base, and testing a program feature of the code base). In certain implementations, a single stage 108, 110, 118, 120 may serve more than one testing purpose. Although two stages 108, 110, 118, 120 are depicted for each job definition file 106, 116, in certain implementations job definition files 106, 116 may have more or fewer stages 108, 110, 118, 120. For example, in certain implementations, a job definition file 106, 116 may have a single stage 106, 110, 118, 120, and in other implementations a job definition file 106, 116 may have more than two stages 108, 110, 118, 120. In some preferred implementations, most job definition files 106, 116 may have ten to fifteen stages 108, 110, 118, 120.

Each stage 108, 110, 118, 120 may include one or more job commands 112, 114, as depicted for stage 110. The job commands 112, 114 may be responsible for implementing the testing function of each stage 108, 110, 118, 120. In particular, the stages 108, 110, 118, 120 may each include a mapping of how to perform the corresponding testing function, and the job commands 112, 114 may implement the testing function within the continuous integration environment 102. For example, the job commands 112, 114 may be generated based on the architecture of the continuous integration environment 102 (e.g., Titan, shell) and the map stored within the stage 108, 110, 118, 120. Accordingly, the specific instructions included within each job command 112, 114 may differ depending on the continuous integration environment 102 (e.g., the architecture used execute the job commands 112, 114 for the specific continuous integration environment 120 implementation).

The duplicate job identifier 126 may be configured to receive job definition files 106, 116 from the job definition file storage 104 and compare the job definition files 106, 116 to identify and replace duplicative or nearly duplicative job definition files 106, 116. The job definition file splitter 128 may be configured to analyze the job definition files 106, 116 to split the job definition files 106, 116 into corresponding stages 108, 110, 118, 120. The job definition files 106, 116 may be split based on keywords 130, such as keywords 130 provided by an application programming interface (API) of the continuous integration environment 102. Alternatively or additionally, the job definition files 106, 116 may be split based on a pattern (e.g., a user-provided, or machine learning-developed pattern).

The corresponding stage identifier 132 may be configured to identify a testing purpose for the stages 108, 110, 118, 120 of the job definition files 106, 116. The corresponding stage identifier 132 may then be configured to identify corresponding stages 110, 120 between the job definition files 106, 116 based on the testing purpose of the stages 108, 110, 118, 120. For example, the corresponding stage identifier 132 may identify the corresponding stages 110, 120 of the job definition files 106, 116 as the stages 108, 110, 118, 120 that perform a same or similar testing purpose. Although two corresponding stages 110, 120 are depicted, the corresponding stage identifier 132 may be configured to identify more than two corresponding stages 110, 120. For example, the corresponding stage identifier 132 may identify three corresponding stages 110, 120: one corresponding stage 110 from a first job definition file 106 and two corresponding stages 120 from a second job definition file 116. In another example, although two job definition files 106, 116 are depicted, the corresponding stage identifier 132 may be configured to identify corresponding stages 110, 120 from three or more job definition files 106, 116 (e.g., one corresponding stage 110, 120 from each of a first, second, and third job definition file 106, 116). In making this comparison, the corresponding stage identifier 132 may determine a testing purpose for each stage 108, 110, 118, 120 and may compare the testing purpose of each of a first plurality of stages 108, 110 from a first job definition file 106 with the testing purposes of each of a second plurality of stages 118, 120 of a second job definition file 116 to identify stages 110, 120 with a same or similar testing purpose within each of the first job definition file 106 and the second job definition file 116. In determining the testing purpose, the corresponding stage identifier 132 may analyze one or more keywords and patterns within the stages 108, 110, 118, 120 and job definition files 106, 116, as detailed further below.

The job comparison module 138 may compare corresponding stages between a first job definition file 106 and a second job definition file 116 to determine whether the job definition files 106, 116 are hard copies or soft copies of one another. In making this comparison, the job comparison module 138 may map each stage 108, 110, 118, 120 and job command 112, 114 of each of the first job definition file 106 and the second job definition file 116 to a common format. Based on the mapped job definition files 106, 116, the job comparison module may determine a similarity measure 140 between the first and second job definition files 106, 116. The job comparison module 138 may determine whether the job definition files 106, 116 are hard copies or soft copies based on the similarity measure 140 (e.g., based on one or more thresholds set based on the continuous integration environment 102). In certain implementations, the job comparison module 138 may also determine whether the job definition files 106, 116 are not copies of one another based on the similarity measure 140.

The generic file generator 142 may be configured to generate a generic job definition file 143 intended to replace two or more job definition files 106, 116 within the continuous integration environment 102. For example, the generic job definition file 143 may be intended to replace the job definition files 106, 116 that are soft copies of one another within the job definition file storage 104. The generic job definition file 143 may include copies of the job commands 112, 114 and/or stages 108, 110, 118, 120 that are identical or nearly identical between the job definition files 106, 116 being replaced. Additionally, for stages 108, 110, 118, 120 and job commands 112, 114 that are not identical, the generic file generator 142 may generate a generic job command 144 for inclusion within the generic job definition file.

One or more of the components of the system 100 may be connected over a network such as the Internet or a local area network. For example, the continuous integration environment 102 may be connected to the duplicate job identifier 126 over a network. The connections may be implemented by one or more physical or wireless interfaces, e.g., Ethernet, Wi-Fi, cellular data, and Bluetooth connections.

One or more of the continuous integration environment 102 and the duplicate job identifier 126 may be implemented by a computer system. In particular, the CPU 122 and the memory 124 may implement one or more features of the continuous integration environment 102 and the CPU 146 and the memory 148 may implement one or more features of the duplicate job identifier 126. For example, the memories 124, 148 may store instructions which, when executed by the CPUs 122, 146, cause the CPUs 122, 146 to perform one or more features of the continuous integration environment 102 or the duplicate job identifier 126.

In addition, each of the continuous integration environment 102, the business intelligence system 118, and the business intelligence integrator 134 may be implemented by more than one computer system. For example, the continuous integration environment 102 may comprise a plurality of separate computer systems (e.g., physical computer systems or virtual computer systems) responsible for implementing the continuous integration environment 102 (e.g., the job definition file storage 104). In such implementations, the CPUs 122, 146 and the memories 124, 148 may also be implemented by a plurality of CPUs and memories.

Figure 2:
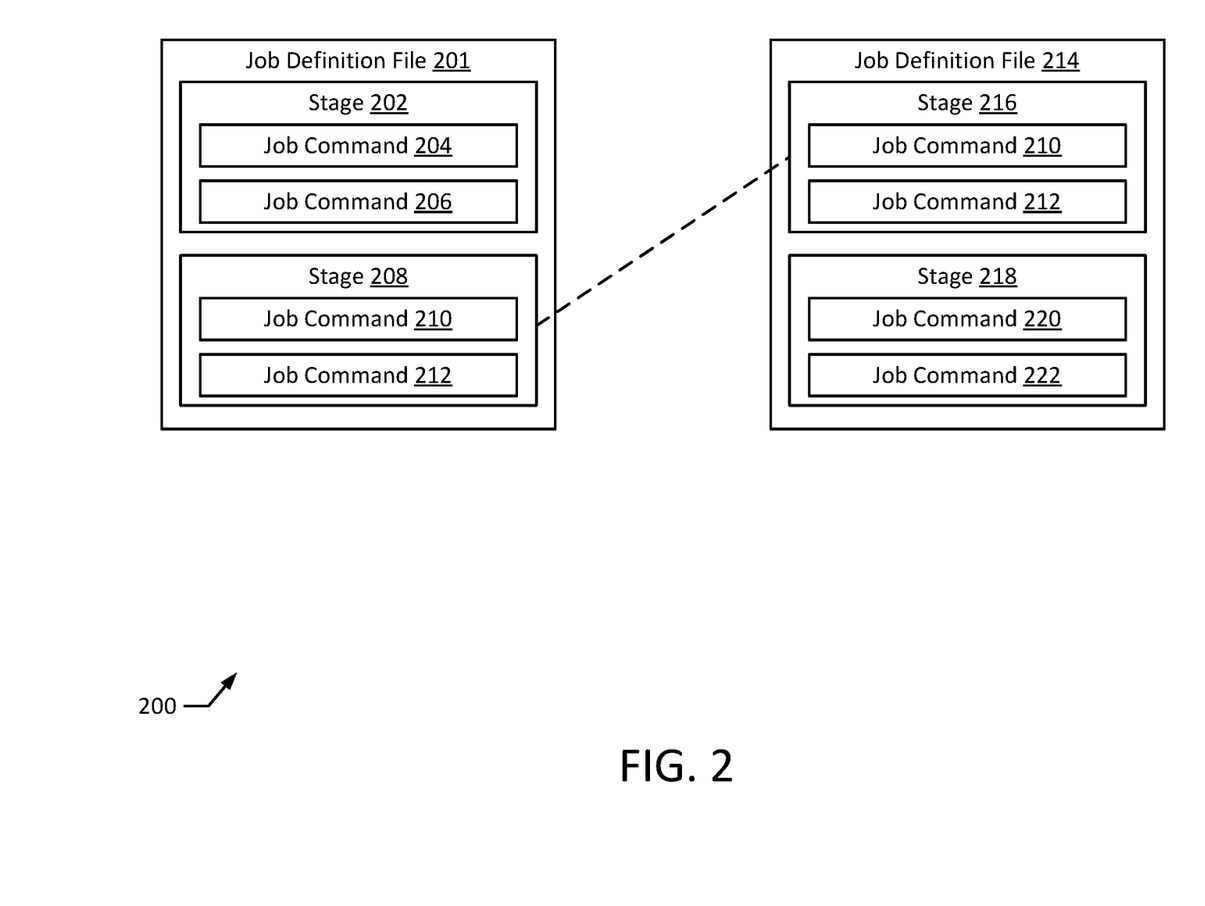
FIG. 2 illustrates a job definition file comparison according to an exemplary embodiment of the present disclosure.

FIG. 2 depicts a job definition file comparison 200 according to an exemplary embodiment of the present disclosure. The job definition file comparison 200 includes job definition files 201, 214. The job definition files 201, 214 include stages 202, 208, 216, 218. As explained above, the stages 202, 208, 216, 218 may correspond to one or more testing purposes. Further, the stages 202, 208, 216, 218 may be expressly defined within the job definition files 201, 214, or may be determined by the job definition file splitter 128 (e.g., based on keywords 130 or patterns).

Stages 202, 208, 216, 218 include job commands 204, 206, 210, 212, 220, 222. The job commands 204, 206, 210, 212, 220, 222 may include one or more actions for execution within the continuous integration environment 102. Although the job commands 204, 206, 210, 212, 220, 222 are depicted for each stage differing numbers of job commands 204, 206, 210, 212, 220, 222 are possible. For example, simpler stages (e.g., 108, 118, 120) may have only a single job command (e.g., only one of 204, 206, 210, 212, 220, or 222). Other stages may have more than two job commands 204, 206, 210, 212, 220, 222 (e.g., 5-7+ job commands 204, 206, 210, 212, 220, 222). Further, although each stage 206, 208, 216, 218 is depicted as including the same number of job commands 204, 206, 210, 212, 220, 222, in certain implementations, stages 206, 208, 216, 218 with differing numbers of job commands 204, 206, 210, 212, 220, 222 are possible.

Once the corresponding stage identifier 132 has identified a testing purpose for each of the stages 202, 208, 216, 218, the corresponding stage identifier 132 may then identify corresponding stages by comparing each stage 102, 208 of a first job definition file 201 with the stages 216, 218 of a second job definition file 214. For example, corresponding stages 216, 208 may be identified based on the testing purpose of each stage. The testing purpose for each stage 102, 208, 216, 218 may be determined by analyzing the job commands 204, 206, 210, 212, 220, 222 of each stage 102, 208, 216, 218. For example, stages with similar job commands 204, 206, 210, 212, 220, 222 may be determined to have a similar testing purpose. As a further example, stages 208, 216 both include job commands 210, 212. Accordingly, the corresponding stage identifier 132 may determine that the stages 208, 216 have a similar testing purpose and are therefore corresponding stages 208, 216. In certain embodiments, the testing purpose of one or more stages 202, 208, 216, 218 may be identified within each stage 102, 208, 216, 218 itself. For example, the testing purpose may be identified within keywords 130 of the stages 202, 208, 216, 218, depending on the implementation of the continuous integration environment 102.

Figure 3:
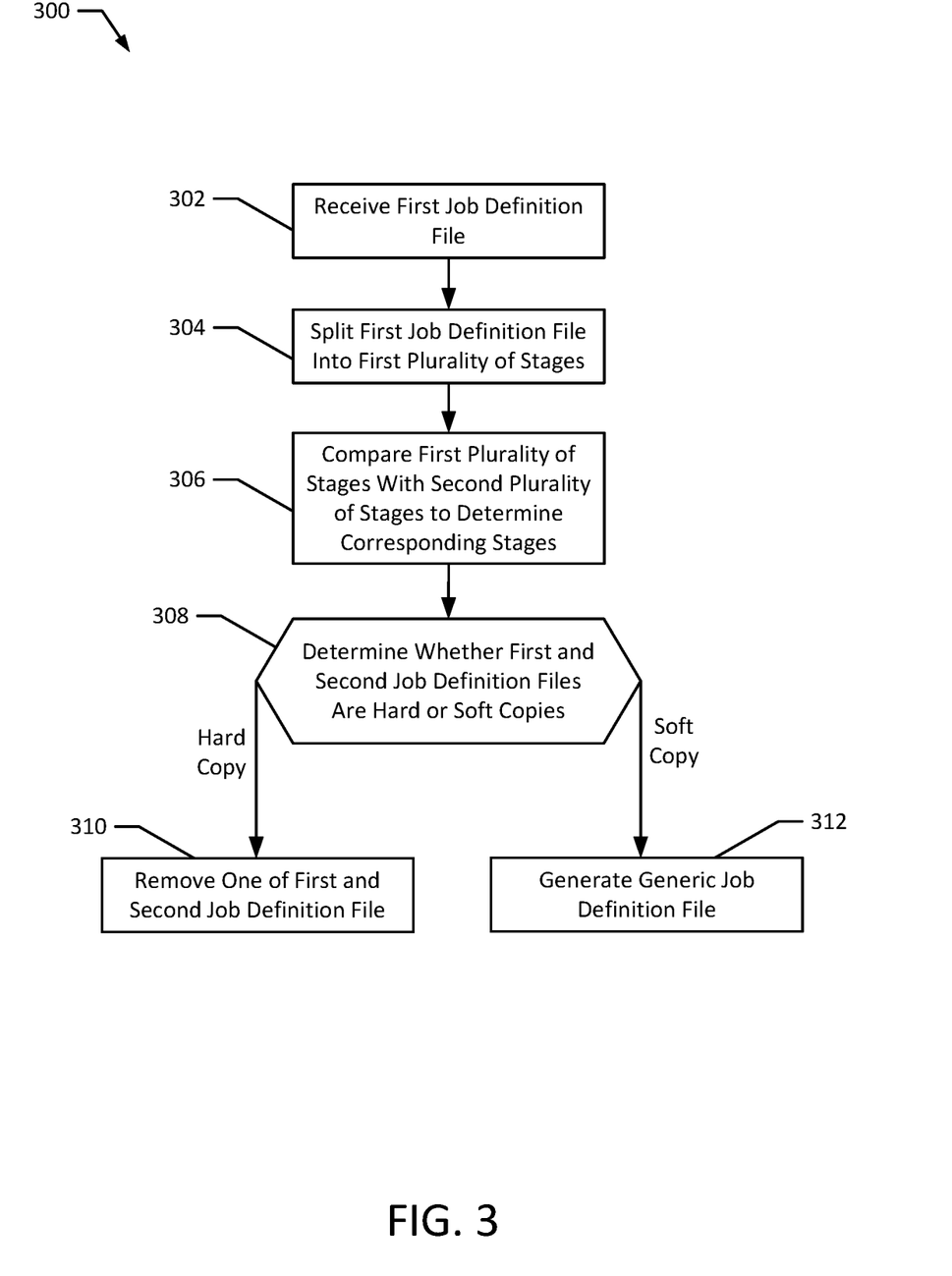
FIG. 3 illustrates a method according to an exemplary embodiment of the present disclosure.

FIG. 3 depicts a method 300 according to an example embodiment of the present disclosure. The method 300 may be used to compare job definition files 106, 116, 201, 214 to identify job definition files 106, 116, 201, 214 that are duplicative or nearly duplicative of one another. The method 300 may be performed by one or more components of the system 100. For example, one or more of the continuous integration environment 102 and the duplicate job identifier 126 may perform one or more aspects of the method 300.

The method 300 may be implemented on a computer system, such as the system 100. For example, the method 300 may be implemented by the continuous integration environment 102 and/or the duplicate job identifier 126. The method 300 may also be implemented by a set of instructions stored on a computer readable medium that, when executed by a processor, cause the computer system to perform the method. For example, all or part of the method 300 may be implemented by the CPUs 122, 146 and the memories 124, 148. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 begins with receiving a first job definition file (block 302). For example, the job definition file splitter 128 of the duplicate job identifier 126 may receive the first job definition file 106, 201 from the job definition file storage 104. In certain implementations, the job definition file splitter 128 may receive the first job definition file 106, 201 over a network connection to the continuous integration environment 102. As explained further above, the first job definition file 106, 201 may include a first plurality of stages 108, 110, 202, 208, each including job commands 112, 114, 204, 206, 210, 212.

The job definition file splitter may then split the first job definition file into a first plurality of stages (block 304). For example, the job definition file splitter 128 may split the first job definition file 106, 201 into a first plurality of stages 108, 110, 202, 208. The first job definition file 106, 201 may be split based on keywords 130, such as keywords 130 provided by an API of the continuous integration environment 102. The keywords 130 may be used within the first job definition file 106, 201 and may indicate or suggest one or more locations within the first job definition file 106, 201 where the testing purpose changes, and therefore where a split between two stages 108, 110, 202, 208 should be located. For example, if the continuous integration environment 102 is implemented by a Jenkins® continuous integration system, the job definition file splitter 128 may query the Jenkins® API and may receive a list of keywords 130 (e.g., "artifact," "stage") indicative of changing testing purposes or stages 108, 110, 202, 208 within the first job definition file 106, 201. The job definition file splitter 128 may then search for these keywords 130 within the first job definition file 106, 201 and may split to the first job definition file 106, 201 into a first plurality of stages 108, 110, 202, 208 where it detects a keyword 130 within the first job definition file 106, 201.

Additionally or alternatively, the first job definition file 106, 201 may be split into stages 108, 110, 202, 208 based on patterns within the first job definition file 106, 201. For example, a job definition file 106, 201 may include a stage 108, 110, 202, 208 with the testing purpose of copying a code base into the continuous integration environment 102. Such stages 108, 110, 202, 208 may typically include initial job commands 112, 114, 204, 206, 210, 212 that set file paths and directory locations for the code base being copied and may typically conclude with a code download command (e.g., a "git _____" command). As another example, "make _____" job commands 112, 114, 204, 206, 210, 212 may typically be included in a stage 108, 110, 202, 208 whose testing purpose is compiling a code base, while "test unit _____" job commands 112, 114, 204, 206, 210, 212 may typically be included in stages 106, 110, 202, 208 whose testing purpose is running unit tests on compiled code bases. In such an instance, where a job definition file 106, 201 includes both "make _____" and "test unit _____" job commands 112, 114, 204, 206, 210, 212, a split between stages 108, 110, 202, 208 is likely to occur between the two job commands 112, 114, 204, 206, 210, 212, because each job command 112, 114, 204, 206, 210, 212 is associated with stages 108, 110, 202, 208 having a different testing purpose.

The patterns used by the job definition file splitter 128 may be user-defined or may be determined by a machine learning model. For example, a user (e.g., a developer) may provide one or more heuristics indicating patterns within typical job definition files 106, 116, 201, 214. As a further example, the user may provide an example job commands 112, 114, 204, 206, 210, 212, 220, 222 and a typically-associated testing process (e.g., that "test unit _____" is typically used with a unit test testing purpose, that "git _____" is typically used with the testing purpose of copying a code base, that "make _____" is typically used with a code base compilation testing purpose). After receiving the user input, the job definition file splitter 128 may store the user input and/or the user-provided rules in a database for use in splitting future job definition files 106, 116, 210, 214 into stages 108, 110, 118, 120, 202, 208, 216, 218. In implementations with a plurality of continuous integration environments 102, or for a plurality of varying code bases, the job definition file splitter 120 may use a separate set of rules for job definition files 106, 116, 201, 214 from each continuous integration environment 102, or for each code base.

Additionally, the job definition file splitter 128 may include one or more machine learning models trained on previously-split job definition files 106, 116, 201, 214 and/or previously-identified testing purposes. Rather than relying on user input, the machine learning model may determine, based on provided previous examples, one or more of the above-identified patterns or keywords 130. For example, the machine learning model may determine that "make _____" is typically used with a code base compilation testing purpose based on previously-provided job definition files 106, 116, 201, 214 indicating stages 108, 110, 120, 120, 202, 208, 216, 218 with a code base compilation testing purpose that include a "make _____" job command 112, 114, 204, 206, 210, 212, 220, 222. The machine learning model may determine this by identifying that such job commands 112, 114, 204, 206, 210, 212, 220, 222 are strongly correlated with the code base compilation testing purpose.

The machine learning model may continue to identify future patterns on an ongoing basis derived from user input. For example, based on previously-identified patterns, the machine the new model may identify and select a suggested split for the first job definition file 106, 201 and may present the suggested split to a user for confirmation. Based on the confirmation or adjustments received from a user, the machine learning model may adjust or strengthen existing patterns, or add new patterns for use in the future.

In detecting the stages 108, 110, 202, 208 within the first job definition file 106, 201, the machine learning model may take into account metadata and global attributes of the first job definition file 106, 116. For example, the job definition file splitter 128 may present global attributes or artifacts that may be used to split the first job definition file 106, 201 to a user. The user may then select the attributes or artifacts desired for use in splitting the first job definition file, which the job definition file splitter 128 will incorporate into the splitting operation.

The first plurality of stages may then be compared with a second plurality of stages to determine common stages (block 306). For example, the job comparison module 138 may compare the first plurality of stages 108, 110, 202, 208 from the first job definition file 106, 201 with a second plurality of stages 118, 120, 216, 218 from a second job definition file 116, 214. The second job definition file 116, 214 may also be received and split by the job definition file splitter 128 into the second plurality of stages 118, 120, 216, 218. The job comparison module 138 may compare the job commands 112, 114, 204, 206, 210, 212 of the first plurality of stages 108, 110, 202, 208 with the job commands 210, 212, 220, 222 of the second plurality of stages 118, 120, 216, 218. The job comparison module 138 may then compute a similarity measure 140 between the first plurality of stages 108, 110, 202, 208 and the second plurality of stages 118, 120, 216, 218. The similarity measure 140 may be computed for each stage 108, 110, 118, 120, 202, 208, 216, 218, or for each job command 112, 114, 204, 206, 210, 212, 220, 222, or for the job definition files 106, 116, 201, 214 overall. In certain instances, the corresponding stage identifier 132 may identify corresponding stages 110, 120, 208, 216 between each of the first plurality of stages 108, 110, 202, 208 and the second plurality of stages 118, 120, 216, 218, as described above. The job comparison module 138 may then compare the corresponding stages 110, 120, 208, 216 to compute the similarity measure 140.

The job comparison module may then determine whether the first and second job definition files are hard copies or soft copies of one another (block 308). For example, the job comparison module 138 may determine whether the first job definition file 106, 201 and the second job definition file 116, 214 are hard copies or soft copies of one another. The job comparison module 138 may determine that the first and second job definition files 106, 116, 201, 214 are hard copies of one another if the job definition files 106, 116, 201, 214 are so substantially similar that they are essentially redundant. The job comparison module 138 may determine that the first and second job definition files 106, 116, 201, 214 are soft copies of one another if the job definition files 106, 116, 201, 214 are very similar, but differ in one or more job commands 112, 114, 204, 206, 210, 212, 220, 222 or stages 108, 110, 118, 120, 202, 208, 216, 218. For example, two job definition files 106, 116, 201, 214 may be soft copies of one another if both are directed to compiling a code base and running the same unit tests on a code base, but may differ in the code base being tested (e.g., the storage location of the compiled and tested code base). Even though the job definition files 106, 116, 201, 214 differ, maintaining both within the job definition file storage 104 and the continuous integration environment 102 may waste system resources and reduce reliability. For example, executing both job definition files 106, 116, 201, 214 separately may waste system resources if both job definition files include steps to download the same dependencies before compilation, as these dependencies will then be downloaded twice: once for each job definition file 106, 116, 201, 214. Similarly, inefficiencies may be created by preparing and running the same unit tests, even though the unit tests themselves may be performed on a separate code bases for each job definition file 106, 116, 201, 214. Further, maintaining, e.g., separate copies of the same unit tests and/or dependencies within each of the job definition files 106, 116, 201, 214 may also reduce reliability, as updates or improvements to one job definition file 106, 116, 201, 214 will not necessarily be reflected in the other. Consolidating such job definition files may help standardize and simplify preparation of such unit tests and job definition files 106, 116, 201, 214 for developers, e.g., by creating a "standard" networking testing file that can be performed by designating a code base for testing. However, rather than requiring the developers to recognize these situations, the job comparison module 138 may detect soft copies within the job definition file storage 104 on an ongoing basis to reduce network traffic to and from the continuous integration environment 102, reduce memory requirements, reduce processing requirements, and reduce synchronization requirements between job definition files 106, 116, 201, 214 corresponding to different software products.

The job comparison module 138 may determine whether the first and second job definition files 106, 116, 201, 214 are hard copies or soft copies based on the similarity measure 140. In doing so, the job comparison module 138 may rely on one or more thresholds. For example, if the similarity measure 140 exceeds a first threshold, the job comparison module 138 may determine that the job definition files 106, 116, 201, 214 are hard copies of one another. The job comparison module 138 may also determine a hard copy if the similarity measure 140 is greater than or equal to the first threshold. As another example, if the similarity measure 140 is less than the first threshold, but exceeds a second threshold, the job comparison module 138 may determine that the job definition files 106, 116, 201, 214 are soft copies of one another. In similar embodiments, the job comparison module 138 may determine a soft copy if the similarity measure 140 is less than the first threshold and greater than or equal to the second threshold, or less than or equal to the first threshold and greater than the second threshold, or less than or equal to the first threshold and greater than or equal to the second threshold.

The first and second thresholds may be set separately for each continuous integration environment 102, or for each of a plurality of collections of code bases (e.g., for each of a plurality of software products). Similar to the similarity measure 140, the threshold may be set for the job definition files 106, 116, 201, 214 overall, for each stage 108, 110, 118, 120, 202, 208, 216, 218 for each job command 112, 114, 204, 206, 210, 212, 220, 222. The threshold may be set after an initial run of the system 100 to determine similarity measures 140 between each of the job definition files 106, 116, 201, 214 within the job definition file storage 104. In this way, the threshold may be customized for each given implementation. In certain implementations, the first threshold may be set at, e.g., 90% similarity, 95% similarity, or 98% similarity. In certain implementations, the second threshold may be set at, e.g., 70% similarity, 80% similarity, or 90% similarity.

Responsive to detecting a hard copy, one of the first job definition file and the second job definition file may be removed (block 310). For example, the duplicate job identifier 126 may delete one of the first job definition file 106, 201 and the second job definition file 116, 214 from the job definition file storage 104 responsive to determining that the job definition files 106, 116, 201, 214 are hard copies of one another. The deletion may happen automatically upon detecting hard copies, or the duplicate job identifier 126 may request user approval prior to deletion. For example, the duplicate job identifier 126 may present an alert to a user requesting deletion of the first or second job definition file 106, 116, 201, 214 from the job definition file storage 104. Additionally or alternatively, the duplicate job identifier 126 may generate a recommendation that the user delete one of the first job definition file 106, 201 and the second job definition file 116, 214 and present the recommendation to the user.

Responsive to detecting a soft copy, a generic job definition file may be generated (block 312). For example, responsive to detecting that the first job definition file 106, 201 and the second job definition file 116, 214 are soft copies, the generic file generator 142 may generate a job definition file 143. The generic job definition file 143 may be based on both the first and second job definition files 106, 116, 201, 214 and may be intended to replace the first and second job definition files 106, 116, 201, 214 in the job definition file storage 104. For example, if the job definition files 106, 116, 201, 214 contain corresponding stages 110, 120, 208, 216 that are identical, the generic file generator 142 may generate the generic job definition file 143 to include a single copy of the identical corresponding stages 110, 120, 208, 216. Similarly, if the job definition files 106, 116, 201, 214 contain stages 108, 118, 202, 218 with no corresponding stage 110, 120, 208, 216, the generic job definition file 143 may be generated to include a copy of each such stage 108, 118, 202, 218 from each job definition file 106, 116, 201, 214. For example, both the job definition files 106, 116, 201, 214 may copy, compile, and test the same code base, but the first job definition file 106, 201 may include a testing stage 108, 110, 202, 208 that runs networking tests on the code base and the second job definition file 116, 214 may include a testing stage 118, 120, 216, 218 that runs functionality tests. According to the above examples, the generic file generator 142 may copy over a single version of the common copy and compile stages 108, 110, 118, 120, 202, 208, 216, 218 and may copy over both versions of the testing stages 108, 110, 118, 120, 202, 208, 216, 218. In this way, the generic job definition file 143 may capture each of the unique aspects of both job definition files 106, 116, 201, 214, while also consolidating the common portions.

Further, for corresponding stages 110, 120, 208, 216 that are similar but not identical, the generic file generator 142 may generate a stage 108, 110, 118, 120, 202, 208, 216, 218 that includes a copy of the job commands 210, 212 common between the corresponding stages 110, 120, 208, 216 and may generic job command 144 for the job commands 112, 114, 204, 206, 220, 222 that are not identical between the corresponding stages 110, 120, 208, 216, as explained further below.

The generic job definition file 143 may be generated automatically upon detection of a soft copy, or the generic file generator 142 may request user approval. For example, the generic file generator 142 may present an alert to the user requesting permission to replace the first and second job definition files 106, 116, 201, 214 with the generic job definition file 143. In other implementations, the generic file generator 142 may generate a recommendation for the user that includes a recommendation to generate a generic job definition file 143 or a pre-generated, recommended generic job definition file 143 for replacing the first and second job definition files 106, 116, 201, 214.

If no copy is determined between the first job definition file 106, 201 and the second job definition file 116, 214, both may be left in the job definition file storage 104.

The method 300 may be repeated for each job definition file 106, 116, 201, 214 in the job definition file storage 104, or for a subset of the job definition files 106, 116, 201, 214 in the job definition file storage 104. The job definition files 106, 116, 201 selected for the subset, or the order of analysis of the job definition files 106, 116, 201, 214, may be selected based on one or more of a priority, date of creation, execution frequency, or utilized resource levels associated with the job definition files 106, 116, 201, 214.

Figure 4A:
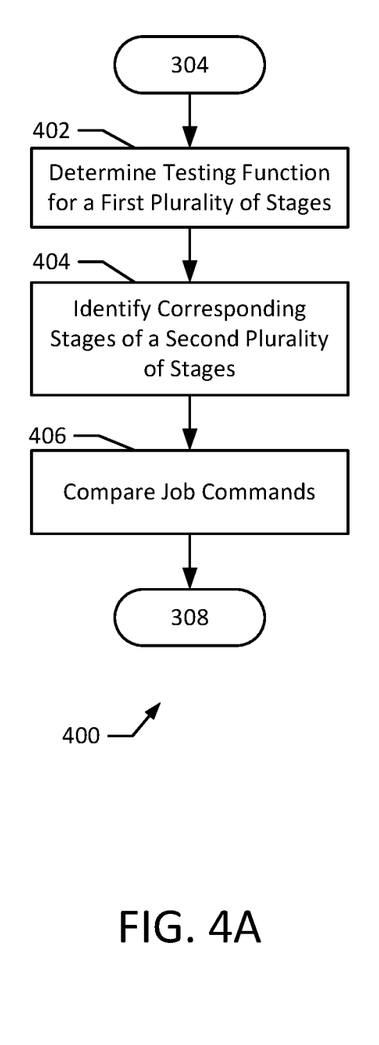
FIGS. 4A-4C illustrate methods according to exemplary embodiments of the present disclosure.
Figure 4B:
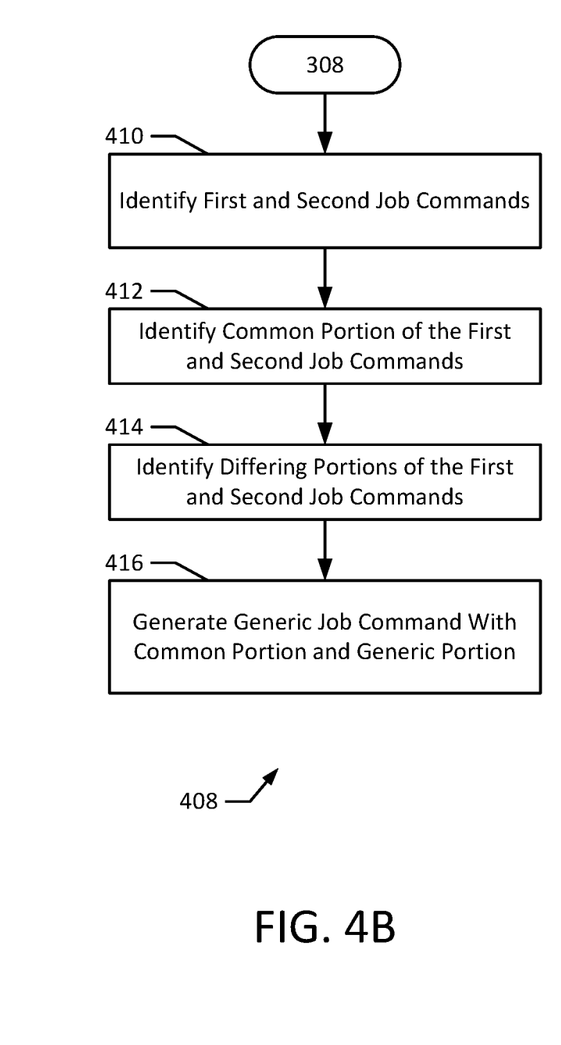
Figure 4C:
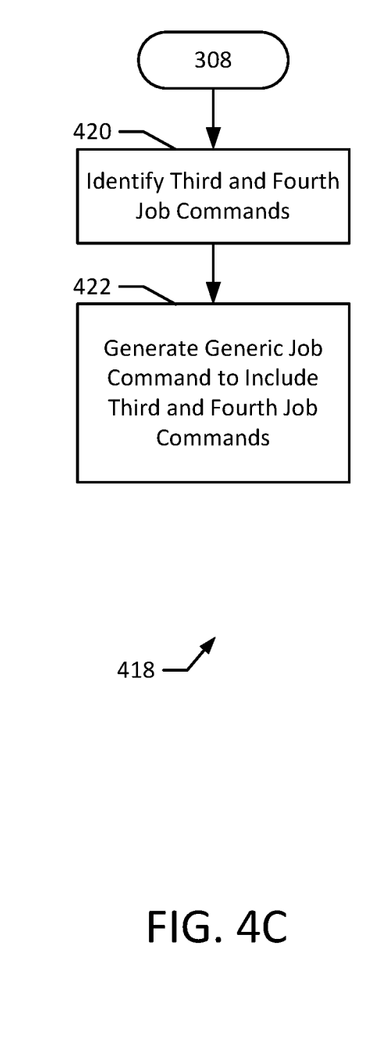

FIGS. 4A-4C depict methods 400, 408, 418 according to exemplary embodiments of the present disclosure. The methods 400, 408, 418 may be performed by one or more components of the system 100. For example, one or more of the continuous integration environment 102 and the duplicate job identifier 126 may perform one or more aspects of the methods 400, 408, 418.

The methods 400, 408, 418 may be implemented on a computer system, such as the system 100. For example, methods 400, 408, 418 may be implemented by the continuous integration environment 102 and/or the duplicate job identifier 126. The methods 400, 408, 418 may also be implemented by a set of instructions stored on a computer readable medium that, when executed by a processor, cause the computer system to perform the method. For example, all or part of the methods 400, 408, 418 may be implemented by the CPUs 122, 146 and the memories 124, 148. Although the examples below are described with reference to the flowchart illustrated in FIGS. 4A-4C, many other methods of performing the acts associated with FIGS. 4A-4C may be used. For example, the order of some of the blocks may be changed, certain blocks may be combined with other blocks, one or more of the blocks may be repeated, and some of the blocks described may be optional.

FIG. 4A depicts a method 400 according to an exemplary embodiment of the present disclosure. The method 400 may be performed to compare a first plurality of stages 108, 110, 202, 208 with a second plurality of stages 118, 120, 216, 218. For example, the method 400 may be performed to implement block 306 of the method 300. As a further example, the method 400 may be performed after the job definition file splitter 128 splits the first job definition file 106, 201 into the first plurality of stages 108, 110, 202, 208 at block 304. In particular, the method 400 may be performed by the corresponding stage identifier 132 and the job comparison module 138.

The method 400 may begin by determining a testing function for the first plurality of stages (block 402). For example, the corresponding stage identifier 132 may determine a testing function for each of or a subset of the first plurality of stages 108, 110, 202, 208 of the received first job definition file 106, 201.

The corresponding stage identifier 132 may identify the testing purpose for the first plurality of stages 108, 110, 202, 208 based on keywords 130 within the stages 108, 110, 202, 208 or the associated job commands 112, 114, 204, 206, 210, 212 of the first plurality of stages 108, 110, 202, 208. For example, a job command 112, 114, 204, 206, 210, 212 containing "git ______" may suggest or indicate that the associated stage 108, 110, 202, 208 has a testing purpose of downloading a code base. As another example, a job command 112, 114, 204, 206, 210, 212 containing "test ______" may suggest or indicate that the associated stage 108, 110, 202, 208 is a testing purpose of running a unit test on a code base. Testing purposes may also be more specific. For example, a job command 112, 114, 204, 206, 210, 212 containing "test ip ______" may suggest or indicate that the associated stage 108, 110, 202, 208 has a testing purpose of performing a networking test, or a test of an Internet protocol (IP) implementation (e.g., a particular IP version).

As also explained above, the testing purpose may also be identified based on patterns, such as user-provided or machine-recognized patterns. For example, the corresponding stage identifier 132 may include a machine learning model configured to analyze the job commands 112, 114, 204, 206, 210, 212 within the first plurality of stages 108, 110, 202, 208 for comparison to previously-analyze stages with known testing purposes.

The corresponding stage identifier may then identify the corresponding stages of a second plurality of stages (block 404). For example, the corresponding stage identifier 132 may identify stages 118, 120, 216, 218 within the second plurality of stages that correspond to one or more stages 108, 110, 202, 208. As further explained above, the corresponding stages 110, 120, 208, 216 may have the same testing purpose and may share one or more common job commands 210, 212. Individual stages 118, 110, 202, 208 may have one corresponding stage 110, 120, 208, 216, a plurality of corresponding stages 110, 120, 208, 216, or may not have a corresponding stage 110, 120, 208, 216.

In certain implementations, the corresponding stage identifier 132 may compare each stage 108, 110, 202, 208 of the first plurality of stages with every stage 118, 120, 216, 218 of the second plurality of stages to identify the corresponding stages 110, 120, 208, 216. In still further implementations, one of the first plurality of stages 108, 110, 202, 208 may have multiple testing purposes that correspond to the testing purposes of more than one of the second plurality of stages 118, 120, 216, 218. For example, the first plurality of stages 108, 110, 202, 208 may include stage 108, 110, 202, 208 with two testing purposes: copying a code base and compiling the code base. The second plurality of stages 118, 120, 216, 218 may contain two stages 118, 120, 216, 218 with corresponding testing purposes: one stage 118, 120, 216, 218 that copies the code base and another stage 1108, 120, 216, 218 that compiles the code base.

The job comparison module may then compare the job commands of the first job definition file and the second job definition file (block 406). For example, the job comparison module 138 may compare the job commands 112, 114, 204, 206, 210, 212 of the first job definition file 106, 201 against the job commands 210, 212, 220, 222 of the second job definition file 116, 214. In particular, the job comparison module 138 may compare the job commands 112, 114, 204, 206, 210, 212, 220, 222 of the corresponding stages 110, 120, 208, 216 identified by the corresponding stage identifier 132. The job comparison module 130 may also generate a similarity measure 140 indicating a level of similarity between the job commands 112, 114, 204, 206, 210, 212 of the first job definition file 106, 201 and the job commands 210, 212, 220, 222 of the second job definition file 116, 214.

In performing the comparison, the job comparison module 138 may map each job definition file 106, 116, 201, 214 to a common format (e.g., a mapping stored in YAML Ain't Markup Language (YAML) format, JavaScript Object Notation (JSON) format, Extensible Markup Language (XML) format). The common format may identify one or more stages 108, 110, 118, 120, 202, 208, 216, 218, nested parameters for the stages 108, 110, 118, 120, 202, 208, 216, 218, and job commands 112, 114, 204, 206, 210, 212, 220, 222 for the stages 108, 110, 118, 120, 202, 208, 216, 218. For example, after the corresponding stage identifier 132 identifies the corresponding stages 110, 120, 208, 216, the job comparison module 138 may map each job command 112, 114, 204, 206, 210, 212, 220, 222 of the corresponding stages 110, 120, 208, 216 to the common format. In such implementations, the common format may put the corresponding stages 110, 120, 208, 216 in the same order. For example, a first job definition file 106, 201 may have a corresponding stage 110, 208 that copies code from a first code base and a subsequent corresponding stage 110, 208 that copies code from a second code base. The second job definition file 116, 214 may have corresponding stages 120, 216 that copy code from the second code base before copying code from the first code base. In practice, the order in which the copies are made from the code base may not be significant, so the job comparison module 138 may reverse the order of the corresponding stages 120, 216 from the second job definition file 116, 214 in mapping the second job definition file 116, 214 to the common format. In this way, the corresponding stages 110, 120, 208, 216 may appear in the same order within the common format, which may simplify comparison (e.g., computing the similarity measure 140).

The mapping process may be determined by one or more libraries. For example, the library may define a mapping process that first populates a mapped job definition file with one or more stages 108, 110, 118, 120, 202, 208, 216, 218 and testing purposes (e.g., the corresponding stages 110, 120, 208, 216), then populates the mapped job definition file with job commands 112, 114, 204, 206, 210, 212, 220, 222 under each of the mapped stages 108, 110, 118, 120, 202, 208, 216, 218, and then populates parameters under related stages 108, 110, 118, 120, 202, 208, 216, 218 and job commands 112, 114, 204, 206, 210, 212, 220, 222. The mapping process may also help account for job definition files 106, 116, 201, 214 with stages 108, 110, 118, 120, 202, 208, 216, 218 that combine multiple testing purposes, as discussed above.

The job comparison module 138 may then compute a similarity measure 140 based on the mapped job definition files. For example, the job comparison module 138 may compute a percentage similarity for each line of the mapped job definition files and may average the percentage to determine a similarity measure 140 of the mapped job commands. As another example, the job comparison module 138 may compute a percentage of the lines of the mapped job definition file that are identical.

FIG. 4B depicts a method 408 that may be performed to generate a generic job command 144. For example, the method 408 may be performed by the generic file generator 142 to generate a generic job command 144 for a generic job definition file 143. For example, if the generic file generator 142 generates a generic job definition file 143 and identifies two job commands 112, 114, 204, 206, 210, 212, 220, 222 that are similar but not identical within the first and second job definition files 106, 116, 201, 214, a generic job command 144 may need to be generated.

The method 408 begins by identifying the first and second job commands (block 410). For example, the generic file generator 142 may identify the first and second job commands 112, 114, 204, 206, 210, 212, 220, 222 as the job commands 112, 114, 204, 206, 210, 212, 220, 222 from, respectively, the first and second job definition files 106, 116, 201, 214 that are similar but not identical.

The generic file generator may then identify a common portion of the first and second job commands (block 412). For example, the generic file generator 142 may identify a common portion of each of the first command 112, 114, 204, 206, 210, 212 and the second command 210, 212, 220, 222. The common portion may include a portion or subset that is identical between the first and second commands 112, 114, 204, 206, 210, 212, 220, 222. For example, if the first job definition file 106, 201 includes a job command 112, 114, 204, 206, 210, 212 that includes "git clone X," which copies a code base from the location X, and the second job definition file 116, 214 includes a job command 210, 212, 220, 222 that includes "git clone Y," which copies a code base from the location Y, the common portion may be identified as "git clone," as both job commands 112, 114, 204, 206, 210, 212, 220, 222 include "git clone." The generic file generator 142 may identify the common portion by comparing the first and second job commands 112, 114, 204, 206, 210, 212, 220, 222 and identifying the portions of each that are identical.

The generic file generator may then identify differing portions of the first and second job commands (block 414). For example, the generic file generator 142 may identify a differing portion of the first and second job commands 112, 114, 204, 206, 210, 212, 220, 222. The differing portions may be the portions or subsets of the first and second job commands 112, 114, 204, 206, 210, 212, 220, 222 that are not identical. For instance, in the above example where the first and second job commands 112, 114, 204, 206, 210, 212, 220, 222 respectively recite "git clone X" and "git clone Y," "X" and "Y" may be the differing portions. After identifying the common portion, the generic file generator 142 may identify the differing portions of the first and second job commands 112, 114, 204, 206, 210, 212, 220, 222 by selecting the remaining portions of each that are not the common portion.

The generic file generator may then generate the generic job command with the common portion and a generic portion (block 416). For example, the generic file generator 142 may generate the generic job command 144 with the common portion and a generic portion. The generic portion may be a generic representation of the differing portions of the first and second job commands 112, 114, 204, 206, 210, 212, 220, 222. The generic portion may take the form of a variable or other indicator that accepts arguments from the continuous integration environment. For instance, in the above example, the generic portion may be indicated by "&location" and the generic job command 144 may be generated as "git clone &location." Moving forward, when the continuous integration environment 102 receives a request to execute one or both of the first job definition file 106, 201 and the second job definition file 116, 214, the continuous integration environment 102 may instead execute the generic job definition file 143 and may provide to the corresponding differing portion for each job definition file 106, 201, 116, 214, which may then replace the generic portion during execution. In the above example, when invoking the generic job command 144, the continuous integration environment 102 may pass one or both of the differing portions (e.g., "X" and "Y").

FIG. 4C depicts a method 418 that may be performed to generate a generic job command 144. For example, the method 420 may be performed by the generic file generator 142 generate a generic job command 144 for a generic job definition file 143. In particular, when the generic file generator 142 generates a generic job definition file 143 and identifies two job commands 112, 114, 204, 206, 210, 212, 220, 222 that are not identical within the first and second job definition files 106, 116, 201, 214, the generic file generator 142 may perform the method 418 to generate a generic job command 144. Additionally or alternatively, when the generic file generator 142 generates a generic job definition file 143 and identifies two job commands 112, 114, 204, 206, 210, 212, 220, 222 that should both be included within the job definition file, the generic file generator 142 may perform the method 418 to generate a generic job command 144. Such instances may include a desire to avoid the continuous integration environment 102 having to pass the differing portions for each job definition file 106, 116, 201, 214 during execution of the generic job definition file 143, or where the job commands 112, 114, 204, 206, 210, 212, 220, 222 share no common portion.

The method 418 may begin by identifying a third and fourth job command of the first and second job definition files (block 420). For example, the generic file generator 142 may identify the third and fourth job commands 112, 114, 204, 206, 210, 212, 220, 222 from, respectively, the first and second job definition files 106, 116, 201, 214 that are not identical. The third and fourth job commands 112, 114, 204, 206, 210, 212, 220, 222 may be similar (i.e., may share a common portion) or may be non-similar (i.e., may share no or a minimal common portion). If the third and fourth job commands 112, 114, 204, 206, 210, 212, 220, 222 are non-similar, the third and fourth job commands 112, 114, 204, 206, 210, 212, 220, 222 may originate in a similar portion of a corresponding stage 110, 120, 208, 216 or may originate in stages 108, 110, 118, 120, 202, 208, 216, 218 or job definition files 106, 116, 201, 214 that are otherwise similar (e.g. based on a similarity measure 140).

The generic file generator 142 may then generate the generic job command to include both the third and fourth job commands (block 422). For example, the generic file generator 142 may generate the generic job command 144 two include both the third and fourth job commands 112, 114, 204, 206, 210, 212, 220, 222. In certain implementations, the third and fourth job commands 112, 114, 204, 206, 210, 212, 220, 222 may be included consecutively within the generic job command 144. Including both the third and the fourth job commands 112, 114, 204, 206, 210, 212, 220, 222 may enable the generic file generator 142 to better account for job definition files 106, 116, 201, 214 that are otherwise similar but that also include non-similar job commands 112, 114, 204, 206, 210, 212, 220, 222. Instead of finding a common portion, as in the method 408, in performing the method 418, the generic file generator 142 includes both the third and fourth job commands 112, 114, 204, 206, 210, 212, 220, 222 while also reducing redundancies earlier in the job definition files 106, 116, 1201, 214 (e.g., copying and compiling a code base). Similarly, including both the third and the fourth job commands 112, 114, 204, 206, 210, 212, 220, 222 may simplify subsequent execution of the generic job definition file 143, as differing portions from the job definition files 106, 116, 201, 214 may not need to be tracked and provided. For example, rather than having to track and provide a differing portion for each job definition file 106, 116, 201, 214 replaced by a generic job definition file 143 having a generic job command 144 with a differing portion, the generic job definition file 143 may be able to execute both the third and the fourth job commands 112, 114, 204, 206, 210, 212, 220, 222 without additional input from the continuous integration environment.

Figure 5:
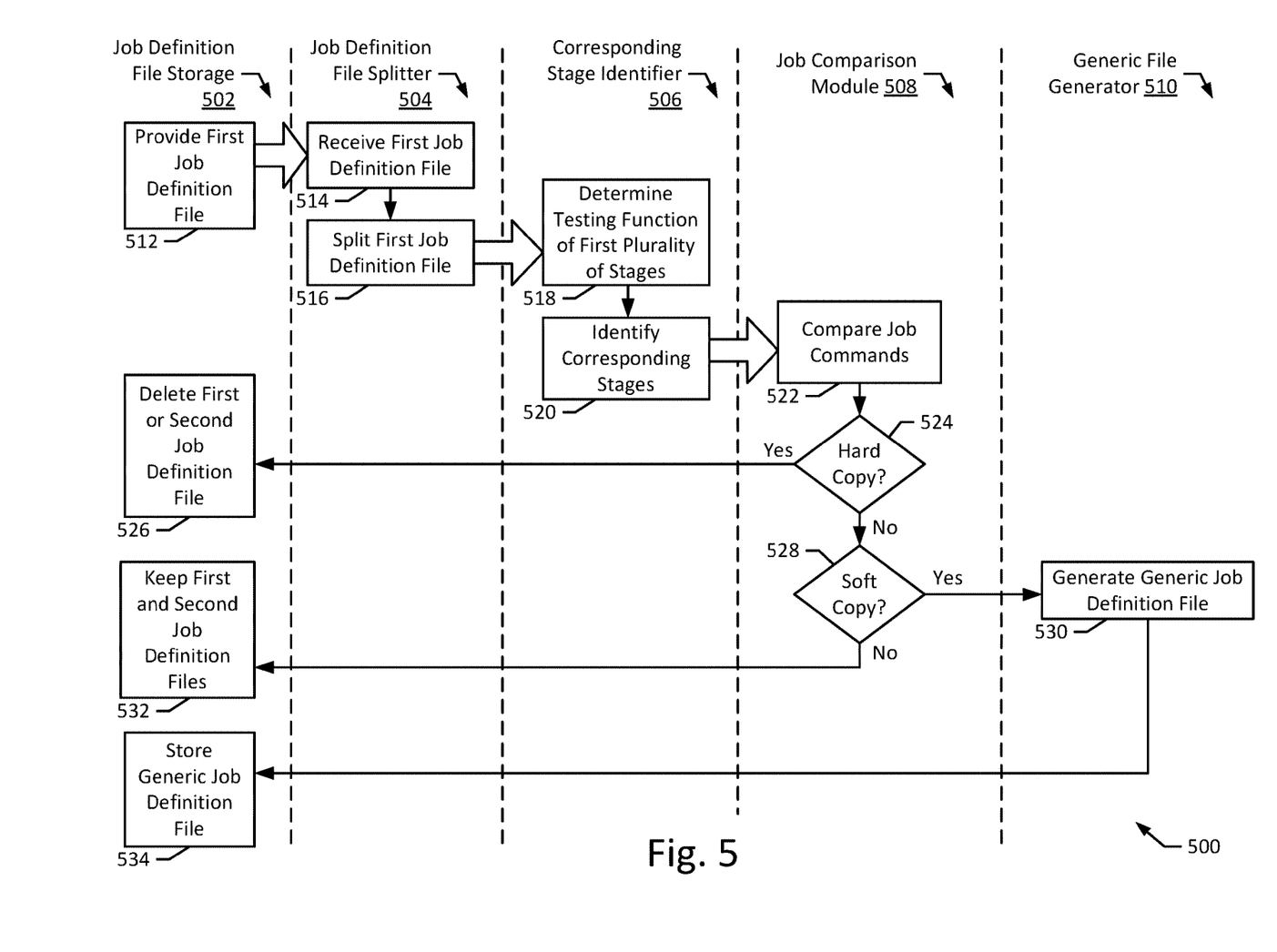
FIG. 5 illustrates a method according to an exemplary embodiment of the present disclosure.

FIG. 5 depicts a method 500 according to an exemplary embodiment of the present disclosure. The method 500, when executed, may compare job definition files 106, 116, 201, 214 to identify job definition files 106, 116, 201, 214 that are hard copies and/or soft copies of one another.

The method 500 may be implemented on a computer system, such as the system 100. For example, method 500 may be implemented by the continuous integration environment 102 and/or the duplicate job identifier 126. The method 500 may also be implemented by a set of instructions stored on a computer readable medium that, when executed by a processor, cause the computer system to perform the method. For example, all or part of the method 500 may be implemented by the CPUs 122, 146 and the memories 124, 148. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 includes a job definition file storage 502, a job definition file splitter 504, a corresponding stage identifier 506, a job comparison module 508, and a generic file generator 510. The method 500 may be performed by the system 100. For example, the job definition file storage 502 may be implemented by the job definition file storage 104, the job definition file splitter 504 may be implemented by the job definition file splitter 128, the corresponding stage identifier 506 may be implemented by the corresponding stage identifier 132, the job comparison module 508 may be implemented by the job comparison module 138, and the generic file generator 510 may be implemented by the generic file generator 142.

The method 500 may begin with the job definition file storage providing the first job definition file 106, 201 (block 512). The first job definition file 106, 201 may be provided to the job definition file splitter 504 over a network connection and may include a first plurality of stages 108, 110, 202, 208.

The job definition file splitter 504 may receive the first job definition file 106, 201 (block 514) and may split to the first job definition file 106, 201 into a first plurality of stages 108, 110, 202, 208 (block 516). The job definition file splitter 504 may split the first job definition file 106, 201 into the first plurality of stages based on one or more keywords 130, user-defined patterns, and/or machine-recognized patterns.

The corresponding stage identifier 506 may receive the first plurality of stages 108, 110, 202, 208 and may determine a testing function for each of the first plurality of stages 108, 110, 202, 208 (block 518). As explained above, the corresponding stage identifier 506 may determine the testing function for the first plurality of stages 108, 110, 202, 208 based on the job commands 112, 114, 204, 206, 210, 212 within each of the first plurality of stages 108, 110, 202, 208, keywords 130 provided by the continuous integration environment 102, or patterns within each of the first plurality of stages 108, 110, 202, 208. The corresponding stage identifier 506 may then identify corresponding stages 110, 120, 208, 216 between the first plurality of stages 108, 110, 202, 208 and a second plurality of stages 120, 120, 216, 218 (block 520). For example, the job definition file splitter 504 may receive a second job definition file 116, 214 and may split the second job definition file 116, 214 into a second plurality of stages 11A, 120, 216, 218. The corresponding stage identifier 506 may identify the corresponding stages 110, 120, 208, 216 as the stages within the first and second pluralities of stages 108, 110, 118, 120, 202, 208, 216, 218 that have the same or similar testing purpose.

The job comparison module 508 may then compare the job commands 112, 114, 204, 206, 210, 212 of the first plurality of stages 108, 110, 202, 208 with the job commands 210, 212, 220, 222 of the second plurality of stages 118, 120, 216, 218 (block 522). Job comparison module 508 may, in particular, compare the job commands 112, 114, 204, 206, 210, 212, 220, 222 of the corresponding stages 110, 208 of the first plurality of stages 108, 110, 202, 208 with the job commands 210, 212, 220, 222 of the corresponding stages 120, 216 of the second plurality of stages 120, 120, 216, 218. Further, the job comparison module 508 may map the stages 108, 110, 118, 120, 202, 208, 216, 218, job commands 112, 114, 204, 206, 210, 212, 220, 222, and associated parameters to a common format for comparison. The job comparison module 508 may further compute a similarity measure 140 indicating a level of similarity between the first job definition file 106, 201 and the second job definition file 116, 214.

The job comparison module 508 may then determine whether the first job definition file 106, 201 and the second job definition file 116, 214 are hard copies of one another (block 524). As explained above, if the similarity measure 140 exceeds a first threshold, the job comparison module 508 may determine that the first job definition file 106, 201 and the second job definition file 116, 214 are hard copies of one another. If the job comparison module 508 determines that the first job definition file 106, 201 and the second job definition file 116, 214 are hard copies, the job comparison module 508 may transmit an indication of the determination to the job definition file storage 502, which may then delete the first or second job definition file 106, 116, 201, 214 (block 526).

The job comparison module 508 may then determine whether the first job definition file 106, 201 and the second job definition file 116, 214 are soft copies of one another (block 528). As explained above, if the similarity measure 140 is less than the first threshold, but greater than a second threshold, the job comparison module 508 may determine that the first job definition file 106, 201 and the second job definition file 116, 214 soft copies of one another. If the job comparison module 508 determines that the first job definition file 106, 201 and the second job definition file 116, 214 are not soft copies, the job comparison module 508 may transmit an indication of the determination to the job definition file storage 502, which may keep both the first and second job definition files 106, 116, 201, 214 (block 532).

If the job comparison module 508 determines that the first and second job definition files 106, 116, 201, 214 are soft copies, the job comparison module 508 may transmit an indication of the determination to the generic file generator 510, which may then generate a generic job definition file 142 (block 530). The generic job definition file 142 may contain a single copy of the stages 108, 110, 118, 120, 202, 208, 216, 218 and/or job commands 112, 114, 204, 206, 210, 212, 220, 222 that are identical between the first and second job definition files 106, 116, 201, 214. The generic job definition file 142 may also contain a generic job command 144, as explained above. The generic file generator 510 may then transmit the generic job definition file 143 to the job definition file storage 502, which may store the generic job definition file 143 (block 534). The job definition file storage 502 may replace the first and/or second job definition files 106, 116, 201, 214 with the generic job definition file 142.

Figure 6:
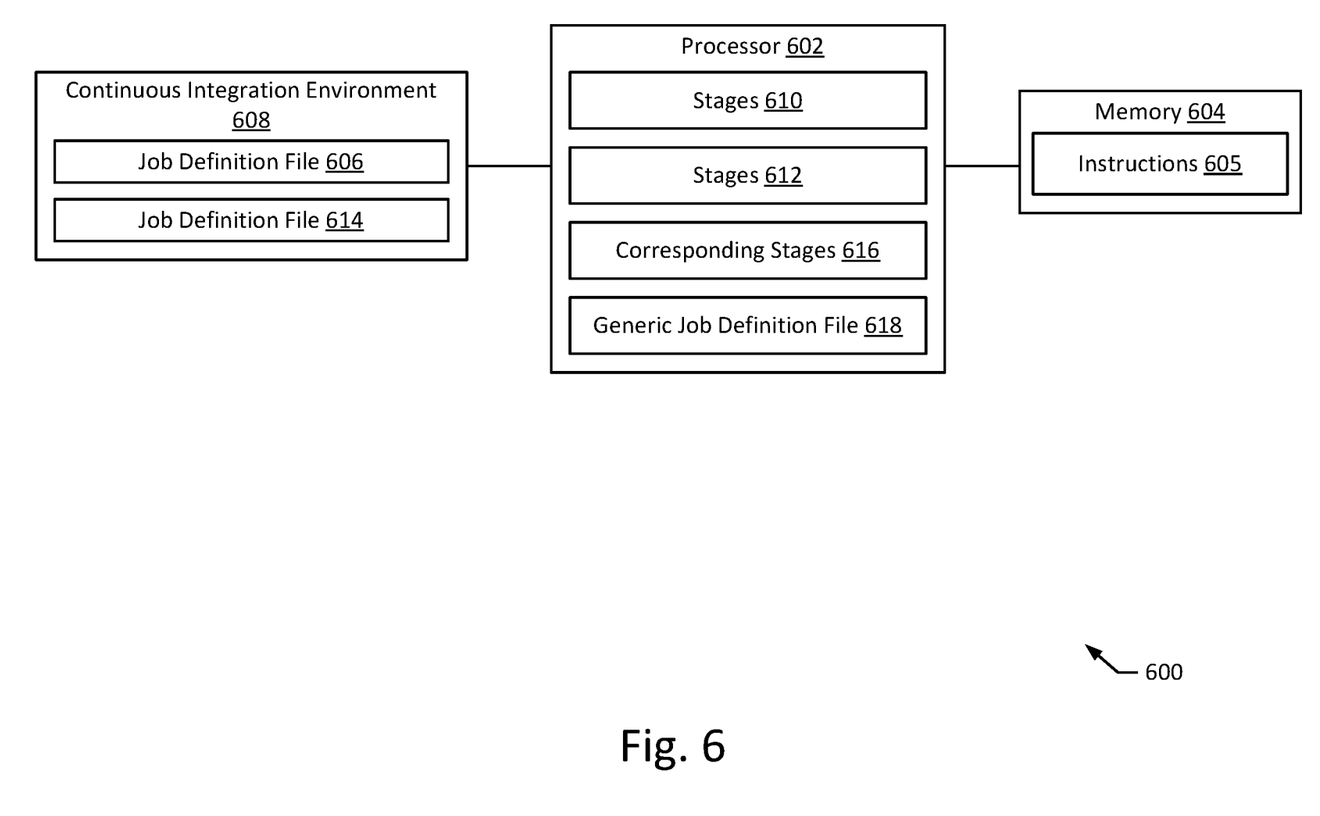
FIG. 6 illustrates a system according to an exemplary embodiment of the present disclosure.

FIG. 6 depicts a system 600 according to an exemplary embodiment of the present disclosure. The system 600 comprises a processor 602 and a memory 604. The memory 604 stores instructions 605 which, when executed by the processor 602, cause the processor 602 to receive a first job definition file 606 for execution in a continuous integration environment 608 and split the first job definition file 606 into a first plurality of stages 610. The memory 604 contains further instructions 605 which, when executed by the processor 602, cause the processor 602 to compare the first plurality of stages 610 with a second plurality of stages 612 from a second job definition file 614 to determine one or more corresponding stages 616 between the first and the second plurality of stages 610, 612 and determine, based on the one or more corresponding stages 616, whether the first and the second job definition files 606, 614 are hard copies or soft copies of one another. The memory 604 contains further instructions 605 which, when executed by the processor 602, cause the processor 602 to remove, responsive to determining that the first and the second job definition files 606, 614 are hard copies of one another, one of the first and the second job definition files 606, 614 from the continuous integration environment 608 and generate, responsive to determining that the first and the second job definition files 606, 614 are soft copies of one another, a generic job definition file 618 based on the first and the second job definition files 606, 614.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving a first job definition file for execution in a continuous integration environment;
splitting the first job definition file into a first plurality of stages;
comparing the first plurality of stages with a second plurality of stages from a second job definition file to determine one or more corresponding stages between the first and the second plurality of stages;

determining, based on the one or more corresponding stages, whether the first and the second job definition files are hard copies or soft copies of one another;

removing, responsive to determining that the first and the second job definition files are hard copies of one another, one of the first and the second job definition files from the continuous integration environment; and generating, responsive to determining that the first and the second job definition files are soft copies of one another, a generic job definition file to replace the first and the second job definition files within the continuous integration environment.

2. The method of claim 1, wherein comparing the first plurality of stages with the second plurality of stages further comprises:

determining a testing function performed by at least a subset of the first plurality of stages; and identifying the corresponding stages as stages from the first and second plurality of stages that perform the same testing function.

3. The method of claim 2, wherein the first plurality of stages comprises a first plurality of job commands and the second plurality of stages comprises a second plurality of job commands.

4. The method of claim 3, wherein comparing the first plurality of stages with the second plurality of stages further comprises:

comparing the job commands of one of the first plurality of stages to the job commands of a corresponding stage from the second plurality of stages.

5. The method of claim 4, wherein the generic job definition file includes a generic job command.

6. The method of claim 5, wherein generating the generic job definition file further comprises:

identifying a first job command of the first job definition file and a second job command of the second job definition file;

identifying a common portion of the first and the second job commands;

identifying differing portions of the first and the second job commands; and generating the generic job command to include the common portion and a generic portion representative of the differing portions of the first and the second job commands.

7. The method of claim 4, further comprising:

identifying a third job command of the first job definition file and a fourth job command of the second job definition file, wherein the third and the fourth job commands do not share a common portion; and generating the generic job command to include both the third and the fourth job commands.

8. The method of claim 1, wherein a hard copy is determined if a similarity measure of the first and the second plurality of stages exceeds a first threshold.

9. The method of claim 8, wherein a soft copy is determined if the similarity measure is less than the first threshold and exceeds a second threshold.

10. The method of claim 9, wherein no copy is determined if the similarity measure is less than the second threshold.

11. The method of claim 1, wherein the first job definition file is split into the first plurality of stages at locations identified based on at least one of a keyword and a pattern.

12. The method of claim 11, wherein the keyword is received from an API of the continuous integration environment.

13. A system comprising:

a processor; and a memory storing instructions which, when executed by the processor, cause the processor to:

receive a first job definition file for execution in a continuous integration environment;

split the first job definition file into a first plurality of stages;

compare the first plurality of stages with a second plurality of stages from a second job definition file to determine one or more corresponding stages between the first and the second plurality of stages;

determine, based on the one or more corresponding stages, whether the first and the second job definition files are hard copies or soft copies of one another;

remove, responsive to determining that the first and the second job definition files are hard copies of one another, one of the first and the second job definition files from the continuous integration environment; and generate, responsive to determining that the first and the second job definition files are soft copies of one another, a generic job definition file to replace the first and the second job definition files within the continuous integration environment.

14. The system of claim 13, wherein the memory contains further instructions which, when executed by the processor, cause the processor to:

determine a testing function performed by at least a subset of the first plurality of stages; and identify the corresponding stages as stages from the first and second plurality of stages that perform the same testing function.

15. The system of claim 14, wherein the first plurality of stages comprises a first plurality of job commands and the second plurality of stages comprises a second plurality of job commands, and wherein the memory contains further instructions which, when executed by the processor, cause the processor to:

compare the job commands of one of the first plurality of stages to the job commands of a corresponding stage from the second plurality of stages.

16. The system of claim 15, wherein the generic job definition file includes a generic job command, and wherein the memory contains further instructions which, when executed by the processor, cause the processor to:

identify a first job command of the first job definition file and a second job command of the second job definition file;

identify a common portion of the first and the second job commands;

identify differing portions of the first and the second job commands; and generate the generic job command to include the common portion and a generic portion representative of the differing portions of the first and the second job commands.

17. The system of claim 15, wherein the memory contains further instructions which, when executed by the processor, cause the processor to:

identify a third job command of the first job definition file and a fourth job command of the second job definition file, wherein the third and the fourth job commands do not share a common portion; and generate the generic job command to include both the third and the fourth job commands.

18. The system of claim 13, wherein a hard copy is determined if a similarity measure of the first and the second plurality of stages exceeds a first threshold, and
wherein a soft copy is determined if the similarity measure is less than the first threshold and exceeds a second threshold.

19. The system of claim 13, wherein the memory contains further instructions which, when executed by the processor, cause the processor to:
split the first job definition file into the first plurality of stages at locations identified based on at least one of a pattern and keyword, wherein the keyword is received from an API of the continuous integration environment.

20. A non-transitory, computer-readable medium storing instructions which, when executed by a processor, cause the processor to:
receive a first job definition file for execution in a continuous integration environment;
split the first job definition file into a first plurality of stages;
compare the first plurality of stages with a second plurality of stages from a second job definition file to determine one or more corresponding stages between the first and the second plurality of stages;
determine, based on the one or more corresponding stages, whether the first and the second job definition files are hard copies or soft copies of one another;
remove, responsive to determining that the first and the second job definition files are hard copies of one another, one of the first and the second job definition files from the continuous integration environment; and
generate, responsive to determining that the first and the second job definition files are soft copies of one another, a generic job definition file to replace the first and the second job definition files within the continuous integration environment.

* * * * *